United States Patent [19]

Morales et al.

[11] Patent Number: 5,440,741
[45] Date of Patent: Aug. 8, 1995

[54] SOFTWARE OVERLOAD CONTROL METHOD

[75] Inventors: Javier Morales, Dover; Whay C. Lee, Cambridge; Michael G. Hluchyj, Wellesley; Pierre A. Humblet, Cambridge, all of Mass.

[73] Assignee: Motorola, Inc., Schaumburg, Ill.

[21] Appl. No.: 123,943

[22] Filed: Sep. 20, 1993

[51] Int. Cl.⁶ .............................................. G06F 9/06
[52] U.S. Cl. .............................. 395/650; 364/DIG. 1; 364/284.4; 364/281.8
[58] Field of Search ............................... 395/200, 650; 340/825.5; 370/60.1, 85.4; 364/DIG. 1 MS File

[56] References Cited

U.S. PATENT DOCUMENTS

| | | | |
|---|---|---|---|
| 4,577,272 | 3/1986 | Ballew et al. | 364/DIG. 1 |
| 4,805,107 | 2/1989 | Kieckhafer et al. | 364/DIG. 1 |
| 4,831,518 | 5/1989 | Yu et al. | 364/DIG. 1 |
| 4,899,143 | 2/1990 | Gopinath et al. | 340/825.5 |
| 5,109,512 | 4/1992 | Bahr et al. | 364/DIG. 1 |
| 5,289,462 | 2/1994 | Ahmadi et al. | 370/60.1 |
| 5,311,513 | 5/1994 | Ahmadi et al. | 370/85.4 |

OTHER PUBLICATIONS

"A Drop and Throttle Flow Control Policy for Computer Networks", Farouk Kamoun, IEEE Transactions on Communications, vol. COM-29, No. 4, pp. 444-452, Apr. 1981.

"Overload Control In Communications Networks", Ulf Korner and Christian Nyberg, 1991 IEEE, GLOBECOM '91, pp. 1331-1335.

"Overload Control of SPC Systems", Ulk Korner, TELETRAFFIC And DATATRAFFIC, pp. 105-114, 1991.

"Flow Control: A Comparative Survey," M. Gerla & L. Kleinrock, IEEE Transactions on Communications, vol. COM-28, No. 4, Apr. 1981.

"Limited Waiting: An Adaptive Overload Control Strategy for Circuit Switched Networks", A Weinrib & G. Gopal, IEEE Journal on Selected Areas in Communications, vol. 9, No. 2, Feb. 1991.

"Overload Control of SPC Processors", F. C. Schoute, Philips Telecommunication Review, vol. 41, No. 4 Nov. 1983.

"Comparison of Call Gapping and Percent Blocking for Overload Control in Distributed Switching Systems and Telecommunications Networks," IEEE Transactions on Communications, vol. 39, No. 4, Apr. 1991.

Primary Examiner—Thomas M. Heckler
Attorney, Agent, or Firm—J. Ray Wood

[57] ABSTRACT

A mechanism and method control software overloads in a communication network system to preserve the throughput capacity of the system in a simple and efficient manner. System load is regulated by accepting, deferring or rejecting work that the system is requested to perform. The criteria used to accept, defer or reject work is based on the relevance of the request and availability of system resources.

17 Claims, 9 Drawing Sheets

SOFTWARE OVERLOAD CONTROL METHOD

FIELD OF THE INVENTION

This invention is generally directed to software overload control in multiprocessor non-shared memory embedded realtime systems, and is more specifically directed to software overload control in communication networks.

BACKGROUND OF THE INVENTION

A communication system is designed to handle a maximum load. Load, in this context of a communication system, is the amount of work that the system has to perform. Under normal conditions, the system throughput increases as the offered load increases. However, if the offered load increases beyond the maximum load, the system experiences an overload condition. Under this condition, the throughput of an uncontrolled system decreases drastically. In a worst case situation, a deadlock condition may occur so that the throughput of the system becomes almost zero. Therefore, a control strategy must be built into the system to prevent throughput degradation due to overload. Preferably, a designed system should maintain an acceptable throughput even if the load demand increases beyond the system capacity.

A communication network consists of nodes that are information processing entities and links that connect them together. To provide for a scalable, fault tolerant architecture, the design of a node is often based on a multiprocessor hardware architecture consisting of a plurality of interconnect communication processor elements. A bus-based interconnect is typically used to support inter-processor communications. The functions performed by such a system include the forwarding of traffic between internodal links, establishment of connections through the network for carrying user traffic, recovery from link and node failures, and reporting of events and collection of statistics for managing the network.

Conditions that may cause overload in such a system include:

(1) Excess rate of new connection set-up requests.
(2) Recovery after a link failure.
(3) Processor failure recovery.
(4) Excess rate of alarm and report generations.
(5) Network management requests.
(6) Internal control and monitoring functions.
(7) Data management functions.

Overload control strategies currently applied to network communication systems focus on the overload caused in a system by an external load: message arrival in store-and-forward packet switching system or incoming call request arrivals in a stored program control switching system. However, there is a need to consider both externally and internally generated loads, and to deal with the different sources of load in the system, such as incoming call requests, failure recovery, network management requests, and audits.

Due to the variety of activities and demands imposed on network communication systems, they must react to overload conditions in a selective manner. Many systems dealing with overload control do not take into consideration this behavioral aspect. The overload state of the system and relevance of a given activity should be considered to determine the reaction of the system.

Finally, there are a set of internal activities, such as audits, that any communication system must perform even in the presence of overload. Current overload control schemes do not directly deal with this issue (they are dealt with partially via other mechanisms).

Thus, there is need for a mechanism and method that address software overloads in a communication network system to preserve the throughput capacity of the system in a simple and efficient manner.

DETAILED DESCRIPTION OF A PREFERRED EMBODIMENT

Figure 1:
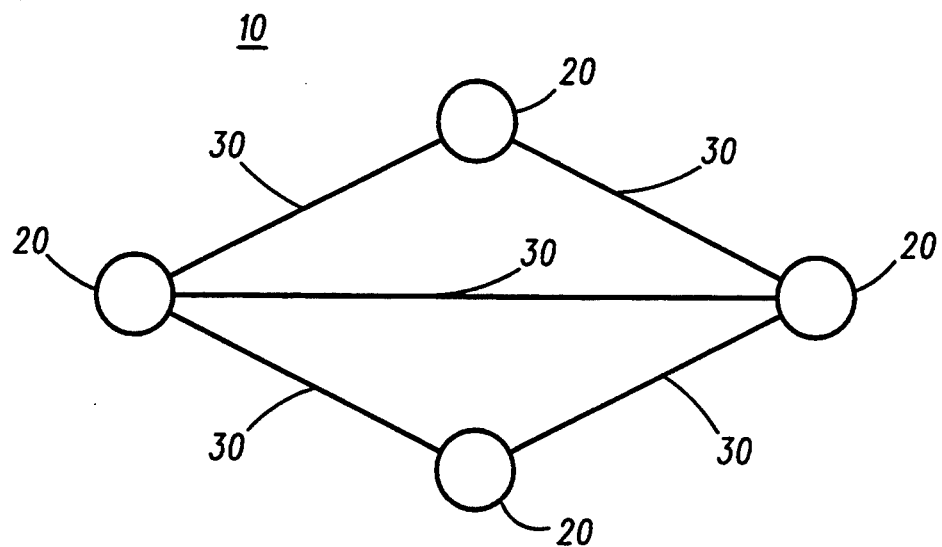
FIG. 1 is a generalized representation of a network.

The present invention applies to a multiprocessor non-shared memory embedded real-time system that may be used in a communication network. Each processing elements is a communication processor (CP). A bus-based interconnect supports inter-processor communication, The software component of the communication system of interest is based on an object-oriented programming model supported by the underlying operating system. From the design perspective, software objects, or simply objects, are abstract entities encapsulating system services or resources, and providing a well defined interface. This interface, defined in terms of a set of operations, represents the sole means to access the resources or services that the objects encapsulate.

At run-time, the operating system provides the execution environment for the system. In this environment, objects interact by invoking each other. One form of object invocation is based on message passing. In this form of invocation, the invoker must acquire a message buffer from the operating system, fill in the information that must be passed, and issue an invocation request. After the invocation is issued, the operating system delivers the request to the invokee. This process includes the enqueueing of the message buffer in the corresponding operation message queue. The message buffer will remain in this queue until the invocation is served (the time when the invocation is served is determined by the operating system scheduler). After an operation is served, the message buffer is freed.

The method of the present invention is based on an overload prevention policy and a resource monitoring mechanism. The system regulates the load on the system by accepting, deferring or rejecting work that the system is requested to perform. The criteria used to accept, defer or reject work is based on the relevance of the request and availability of system resources.

To satisfy a request, and thus to produce work, certain system resources are consumed. In an object-oriented software system based on a message passing invocation paradigm, message buffers can represent the ultimate resource in the system. This is true if message buffers are managed such that central processing unit (CPU) cycles are not the critical resource or bottleneck (in this case, the system will deadlock if it runs out of message buffers even though CPU cycles may still be plentiful).

By monitoring the consumption of message buffers and taking into consideration the relevance of requests, the present invention preserves the throughput capacity of the system in a simple and efficient manner. In particular, the following objectives are achieved:

(1) Acceptable control overhead at light load.
(2) Prevention of throughput degradation at heavy load.
(3) Deadlock avoidance.
(4) Fair allocation of resources among users who issue requests.
(5) Simple, but efficient and robust mechanism.
(6) Hysteresis in overload thresholds for avoiding boundary crossings.

The key elements of the present invention that produce the improvements described above are:

(1) Selective Probing: Check overload conditions, by means of probing, at specific points of an activity's invocation chain.
(2) Efficient Denial: Reject requests close to the source of the request if an overload condition exists.
(3) Selective Deferral: Defer critical requests by waiting for the overload condition to subside.

The above elements are supported by the underlying operating system by way of "probe" and "schedule". "Probe" is a call used to obtain actual overload information at run time, for supporting selective probing. Schedule allows objects to selectively defer posted requests.

FIG. 1 is a generalized representation of a communication network 10. The network 10 allows communication between users at different nodes 20. Nodes 20 are interconnected by a plurality of links 30. Links 30 may be satellite links, optical cables, or microwave links.

Figure 2:
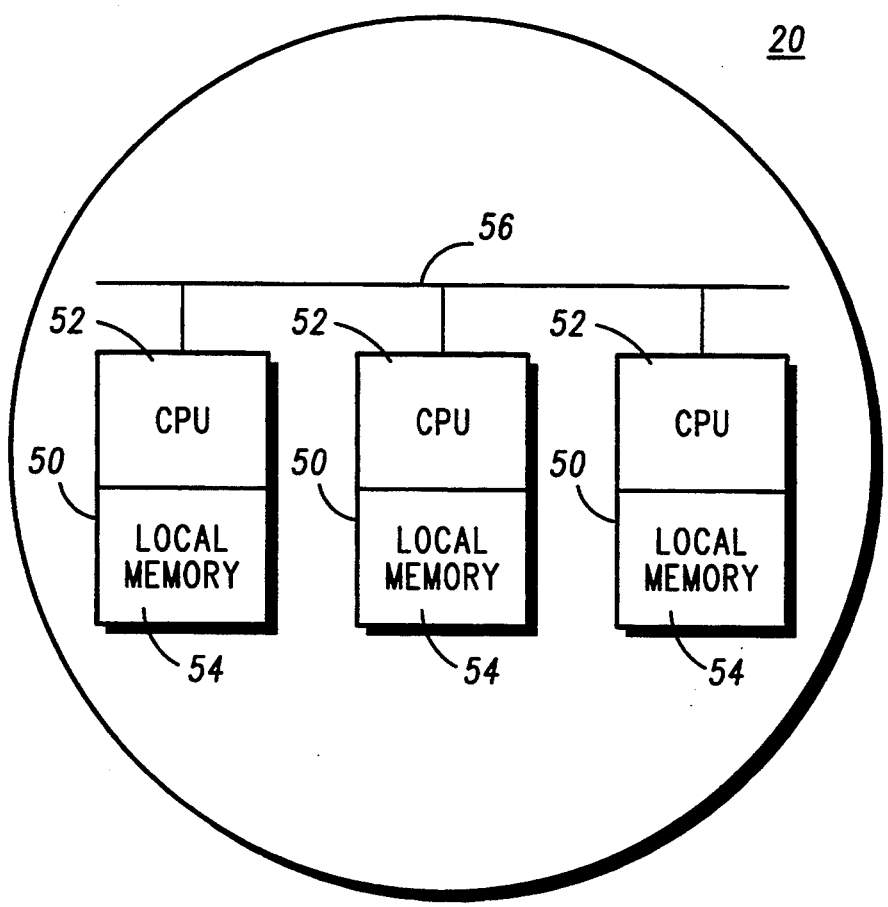
FIG. 2 is a functional block diagram of a node.

FIG. 2 shows a functional block diagram of a node 20, which consists of a collection of interconnected communication processors (CPs) 50. A CP 50 comprises a central processing unit (CPU) 52 and a local memory 54. The CPs 50 are interconnected by a processor interconnect bus 56. CPs 50 communicate with each other by sending messages over the interconnect bus 56. A node 20 is an embedded real-time computer system and has many functions. A node 20 may be the access point to the network, switching point in the network, and a control point of the network.

Figure 3:
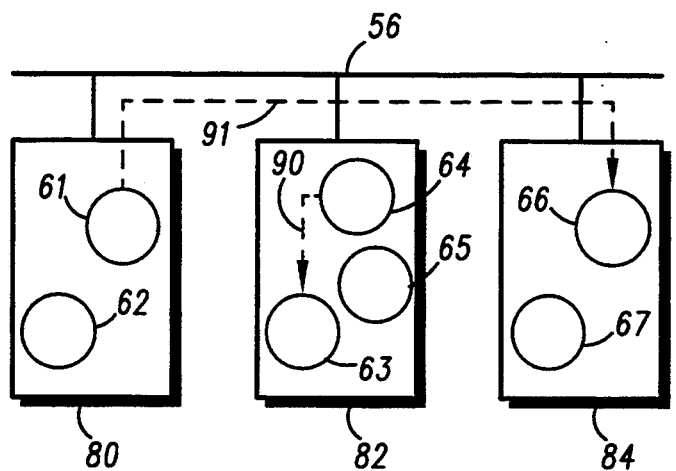
FIG. 3 shows the software components distributed over different communication processors.

FIG. 3 shows the software components distributed over three communication processors 80, 82, 84 residing in a node 20. Various software objects 61, 62, 63, 64, 65, 66, 67 are present in the communication processors 80, 82, 84.

To satisfy a request, an object typically makes use of ("invokes") another object. There are two levels of object invocation: intra-CP and inter-CP. At the intra-CP level, an object in a CP invokes another in the same CP. At the inter-CP level, an object in a CP located at a given node invokes another in a different CP that may be located at the same node or a remote node.

As objects interact with one another, their corresponding operation queues are filled with message buffers. The rate at which operations are served, i.e., the rate of message buffer consumption, is determined by the system processing capacity. If the offered load is high, a large number of message buffers will be consumed (due to object interactions). Thus, the number of available message buffers can be used as a measure of the amount of work that the system has to perform.

The two levels of object invocation are illustrated in FIG. 3. Intra-CP invocation 90 occurs when an object 64 in a CP 82 invokes another object 63 also located in the same CP 82. Inter-CP invocation 91 occurs when an object 61 in a CP 80 invokes another object 66 in a different CP 84. Inter-CP invocations in the same node make use of an interconnect bus 56 to communicate invocation messages.

Figure 4:
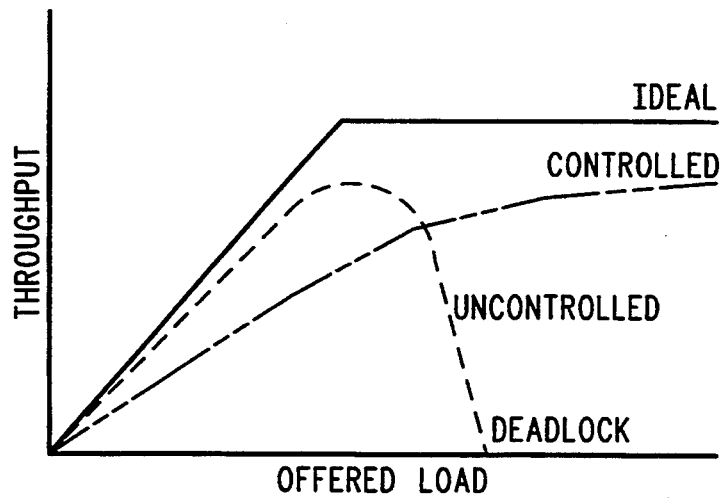
FIG. 4 shows the behavior of a communication system in terms throughput as a function of offered load.

FIG. 4 shows the behavior of a communication system in terms of its throughput as a function of offered load. In the ideal situation, throughput increases linearly to its maximum as the offered load increases further. The throughput stays at the maximum as the offered load increases. In an uncontrolled system, throughput ramps up, but falls quickly when system resources begin to overload. If the offered load continues to increase, the system goes into deadlock. In a controlled system, throughput increases gradually so as to approach the ideal as the offered load increases.

When there is an overload condition, a CP must necessarily reject requests for work to conserve message buffers, or defer the requests if they are critical (e.g., CP failure recovery). The following guiding principles for overload control are preferably used:

(1) A request should only be accepted if there are plenty of buffers available on the local CP.
(2) A request should only be accepted if there are "enough" (not plenty of) resources available on each and every one of the CPs in the node.
(3) When rejection is warranted, it must be done close to the origin of the request.
(4) Once a request has been admitted into the network, it should be processed by all means, and it should only be aborted if a critical resource is missing.
(5) If a request leads to a fan-out of invocations (i.e., the invocation of an object results in that object in turn invoking more than one other object), the processing of these fan-outs may be deferred.

Figure 5:
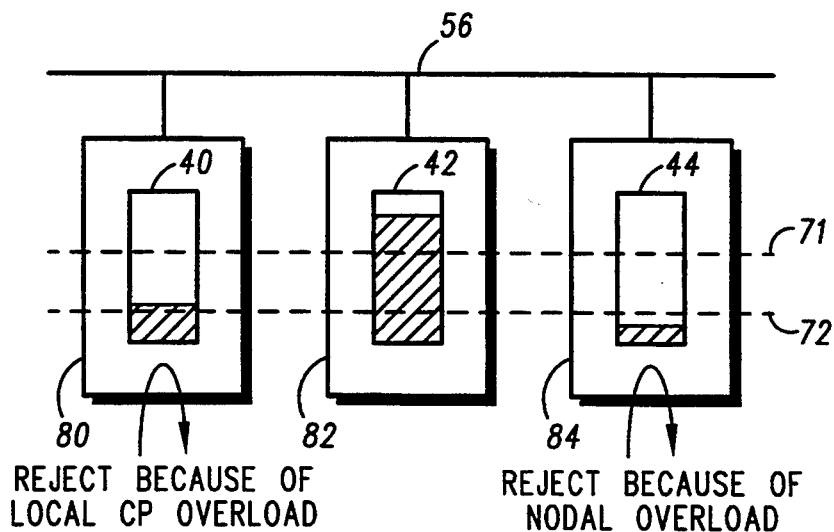
FIG. 5 shows a view of the overload levels in the communication processors within a node.

A system utilizing the above overload control principles avoids overload adaptively, rather then controlling overload after it has occurred. FIG. 5 shows a typical view of the overload levels in communication processors 80, 82, 84 within a node 20. When a request is made for the invocation of an object, the system looks at two thresholds to determine whether to comply with the request. The nodal overload threshold 71 is a predefined limit. If any CP in the node is operating above the threshold, even if a request is made to invoke an object at a different CP, the request is rejected. As shown in FIG. 5, a request is rejected at a CP 84 because another CP 82 was operating above the nodal overload threshold 71.

A second threshold is the local overload threshold 72. Again referring to FIG. 5, a request to invoke an object at a CP 80 is rejected because another CP 82 is operating above the local overload threshold 72. As shown in FIG. 5, the local overload threshold 72 is less than the nodal overload threshold 71.

The overload control strategy of the present invention is implemented with a rule-based decision maker that uses a probe function for assessing the level of overload before deciding on an appropriate action for a request from an application. Timely processing of critical requests is enforced to avoid deadlocks, and to preserve sequencing.

In accordance with the overload control method of the present invention, a probe call returns a "failure" if either the local CP is mildly overloaded (40 in FIG. 5), or if any CP is moderately overloaded (42 in FIG. 5) in the node. Otherwise, it returns "success". Should a request be rejected when its probe call returns "failure", it does not imply that the local CP is overloaded (e.g., CP 84 FIG. 5). The request is rejected since the resources of the overloaded CP 82 may be needed to complete the request.

The probe function is called by selected requests in accordance with the overload control method of the present invention. It is issued with an argument (or parameter) indicating the type of request (e.g., call setup, call release after a link failure, CP failure). The criterion for a probe reply ("success" or "failure") depends on this argument. It may be based on message buffer levels, or other appropriate overload indicators.

There can be multiple threshold levels for the probe function, each associated with a given priority. Multiple threshold levels are useful for the following reasons:

(1) To avoid deadlocks, the further away from the origin of a chain of object invocations, the higher the threshold. This allows the node to complete work already started, at the expense of rejecting or delaying new work.

(2) An object with a small fan-out may be given a higher threshold.

(3) Preferential service may be needed for different priorities of requests for an object.

For each application that processes new requests, points of fan-outs within each chain of object invocations must be identified for potential application of the probe. If a probe call returns "failure", an application must either reject the request (e.g., request for new connections), or defer the request (e.g., link failure recovery). To avoid deadlocks, an object that defers following a probe must release as many resources as possible, including the message (if any) that triggered the probe.

A broadcast mechanism is used to disseminate overload status, or specifically the state of message buffers. The maximum of all local overload levels in a node is referred to as the nodal overload level.

Referring again to FIG. 5, two overload thresholds for determining if a CP can accept a request are the nodal overload threshold 71 and the local overload threshold 72. A request is rejected by a CP in the node if either the local overload level at that CP exceeds the local overload threshold 72, or the nodal overload level exceeds the nodal overload threshold 71.

Figure 6:
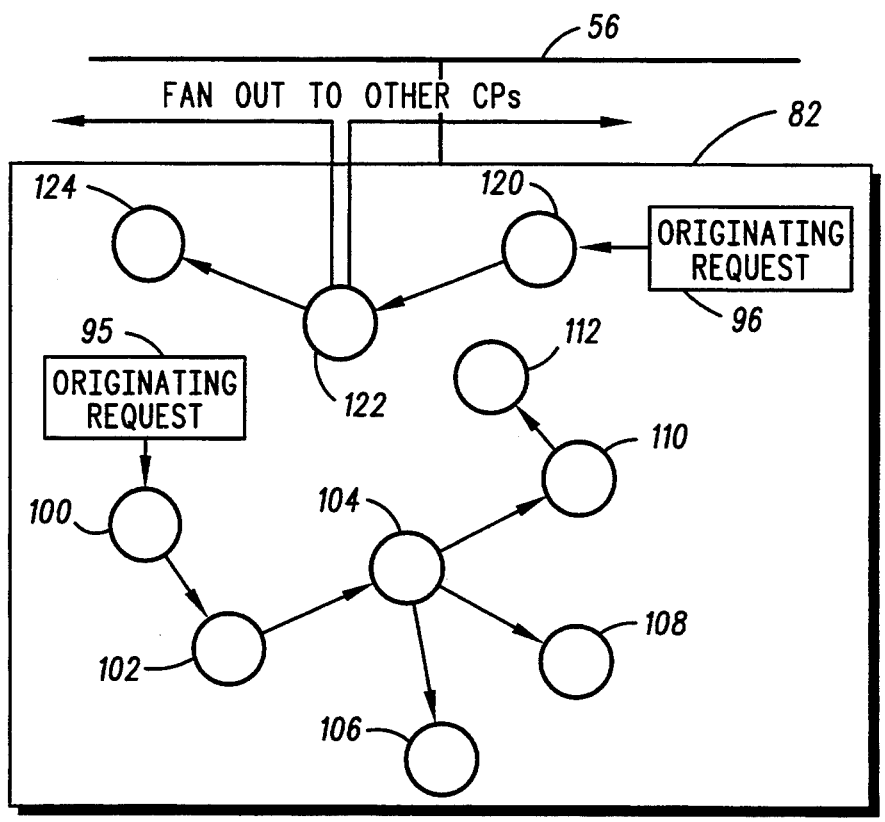
FIG. 6 shows the invocation activities within a communication processor.

FIG. 6 shows the invocation activities, including intra-CP and inter-CP fan-outs. Intra-CP fan-out is shown by an originating request 95. An originating request 95 invokes an object 100, which invokes another object 102. Object 102 invokes three objects 106, 108 and 110. Object 110 invokes object 112. Thus, the initial invocation of only one object in a CP resulted in the invocation of seven objects within the same CP.

An inter-CP fan-out is shown by an originating request 96. Originating request 96 invokes an object 120, which invokes another object 122. Object 122 invokes object 124 in CP 84, but additionally invokes objects in other CPs. Thus, not only are objects invoked in the initial CP receiving an originating request, but also in other CPs within the node.

An originating request typically generates a chain of subsequent object invocations with message passing. Each object invocation gives rise to one or more other object invocations until the originating request is completely served.

For example, an originating request 95 is made at an object 100, which invokes another object 102, which in turn invokes an additional object 104. Three other objects (106, 108, and 110) are subsequently invoked by object 104. The invocation of object 104 thus leads to a "fan-out" of 3. Finally, object 110 invokes object 112, and the chain is completed.

The fan-out at object 104 is localized with respect to the CP 82. The fan-out at object 122 is not localized since some of the fan-out invocations are issued to objects in remote CPs. When a fan-out is not localized, the work resulting from the fan-out is spread over multiple CPs.

Figure 7:
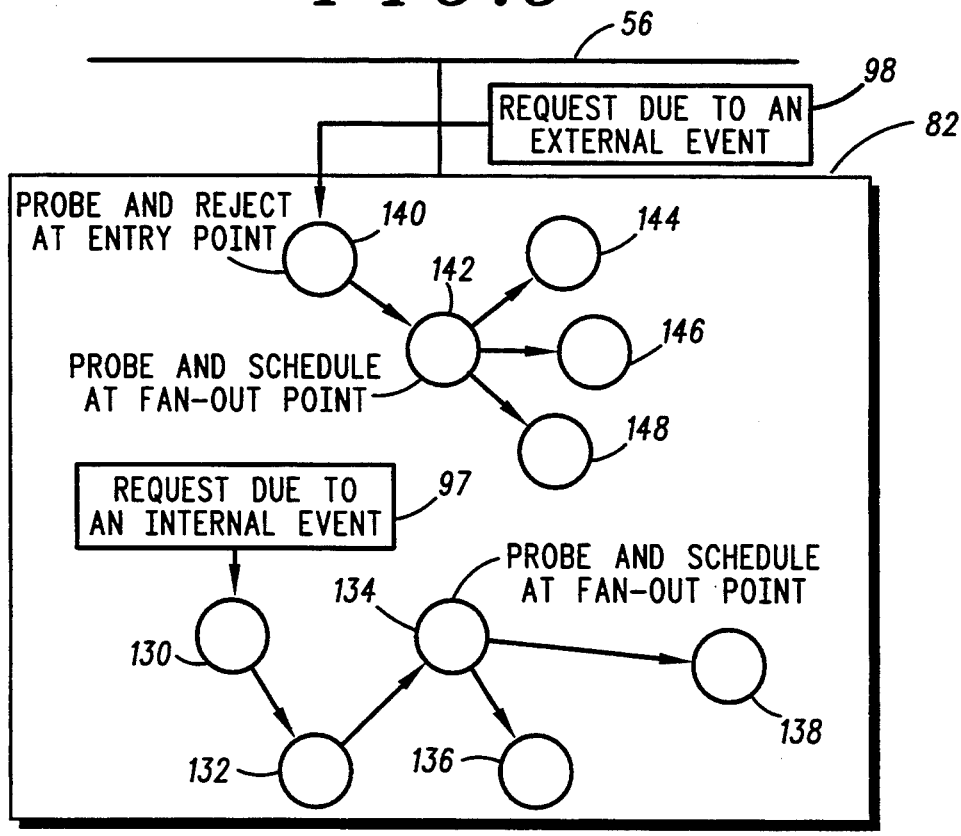
FIG. 7 shows a typical scenario and points of possible application of an overload control probe inside a communication processor.

Two alternative actions address system overload are "probe-and-reject" and "probe-and-schedule". FIG. 7 shows a scenario inside a communication processor 82. A request 97 due to an internal event invokes an object 130. Object 130 in turn invokes object 132, and object 132 in turn invokes object 134. Because object 134 produces a fan-out, a probe-and-schedule occurs. When request 98 occurs due to an external event, probe-and-reject occurs at object 140 in CP 82. Object 142 is a fan-out point to objects 144, 146 and 148. If object 140 is allowed to invoke object 142, before object 142 invokes objects 144, 146 and 148, a "probe-and-schedule" occurs.

For requests that are subject to precedence constraints, out-of-sequence problems are avoided by making the probe-and-schedule "sticky". As long as the probe returns "success", the request is processed normally. After the probe first returns "failure", subsequent probes at that same or lower threshold level for the object will be forced to return "failure", until it relinquishes control of the CPU explicitly.

In probe-and-schedule, the duration of the deferral is designed to last until the overload level drops below a predetermined threshold for the given probe level (hysteresis is applied to avoid excessive boundary crossings and is described in FIG. 12). probe takes as arguments the threshold level associated with the calling method.

How a probe should be applied to a request depends on the kind and source of the event to which the request is associated. Each event is characterized in terms of the frequency at which the event occurs and its delay sensitivity. A sporadic event is one that occurs once in a while, and cannot be delayed excessively. A recurrent event is one that occurs frequently, and may be rejected without causing a significant impact on the user.

The source of an event is characterized in terms of the origin of its request. If the origin is generated by an entity outside the system, the entity is referred to as an external source. If the origin is generated by an entity within the system, the entity is referred to as an internal source.

Figure 8:
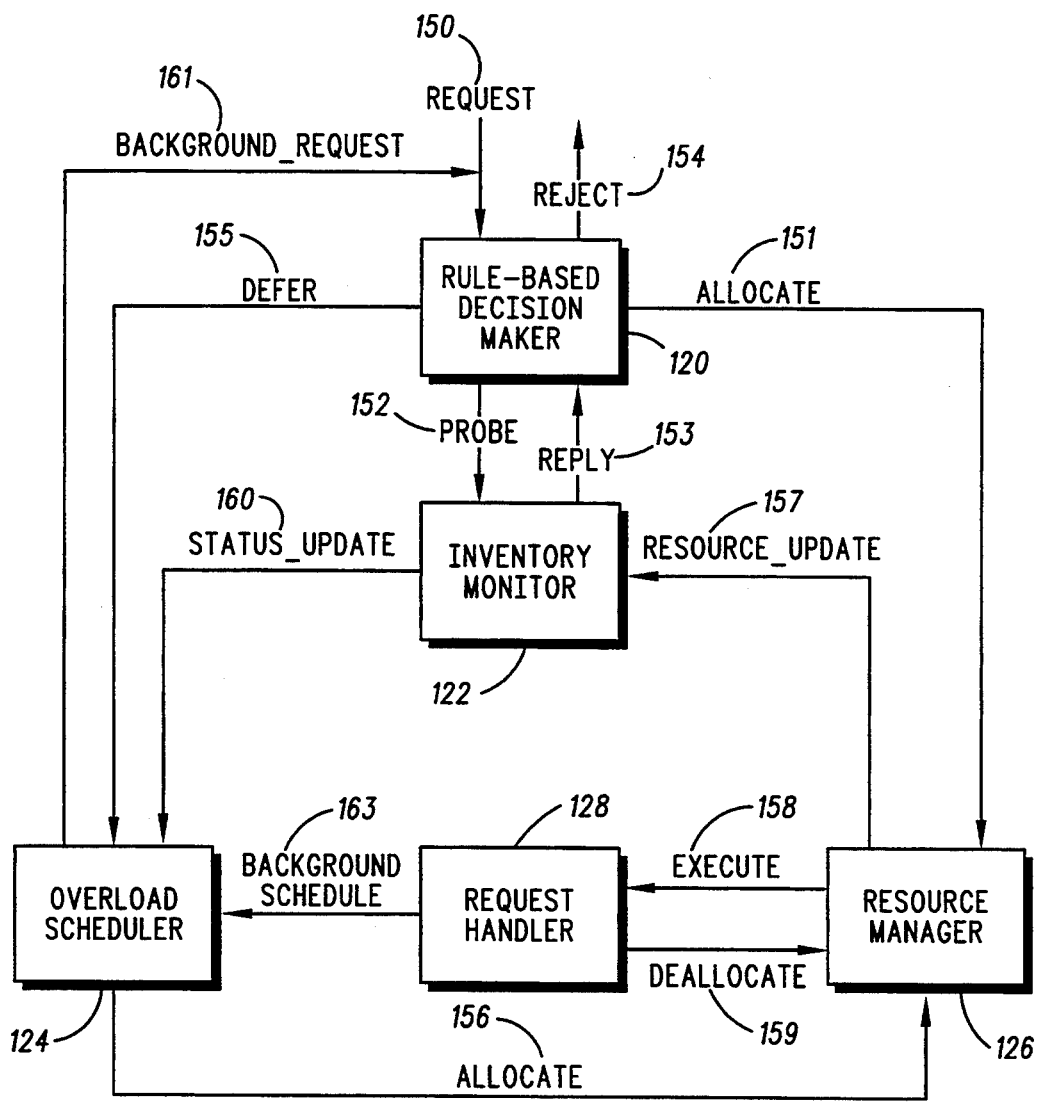
FIG. 8 shows the functional block diagram for the software overload control system.

FIG. 8 shows a functional block diagram for the software overload control system in accordance with the present invention. There are five functional blocks: rule-based decision maker 120, inventory monitor 122, overload scheduler 124, resource manager 126, and request handler 128. The overload control system prevents the degradation of node 20 throughput due to overload by regulating the work that is performed by node 20. This is accomplished by either accepting, rejecting or deferring every request that must be processed by software objects.

Referring to the block diagram in FIG. 8, upon arrival of a request 150, the rule-based decision maker 120 decides whether to allow immediate processing by issuing an allocate notification 151 to the resource manager 126 or subject the request 150 to overload control. If the request 150 is subject of overload control, then the rule-based decision maker 120 issues a probe request 152 to the inventory monitor 122. The information passed by the probe 152 from the rule-based decision maker 120 to the inventory monitor 122 contains the relevance and resource consumption requirements of the request 150. The inventory monitor 122 uses this information together with the current resource consumption in the node 20 to determine the outcome of the probe 152. If there are insufficient resources in the node 20 to satisfy the request 150, then the reply 153 indicates failure. Otherwise, the reply 153 indicates success.

The rule-based decision maker 120 uses the reply 153 supplied by the inventory monitor 122 to either reject (154) the request 150, defer (155) the request 150 or proceed with the processing of the request 150 by issuing an allocate notification 151 to the resource manager 126. On success, the request 150 is allowed to proceed. On failure, the rule-based decision maker 120 makes use of its rule base to either reject (154) the request 150 or defer (155) the request 150 for future processing. On reject, the original requester is notified via a reject notification 154. On defer, the rule-based decision maker 120 issues a defer request 155 to the overload scheduler 124. The defer request 155 includes relevance information to allow the overload scheduler 124 to decide when the deferred request can be processed.

Once a request is allowed to proceed, as determined by either the rule-based decision maker 120 or the overload scheduler 124, the needed resources are allocated by issuing an allocate request (151 or 156) to the resource manager 126. After the resources are allocated, the resource manager 126 issues a resource_update notification 157 to the inventory monitor 122 and notifies the request handler 128 to execute (158) the request 150. As the request handler 128 executes a request, it relinquishes resources by issuing deallocate notifications 159 to the resource manager 126. These deallocate notifications cause the resource manager 126 to issue resource_update notifications 157 to the inventory monitor 122.

The resource_update notifications 157 allow the inventory monitor 122 to update the local and global resource consumption information and notify the overload scheduler 124 of any status update. Upon reception of the status_update notification 160, the overload scheduler 124 determines, based on its scheduling policy, whether deferred requests should be executed and/or background requests 161 reissued.

Requests are classified as normal or background. Normal requests are those that terminate after they have been executed (i.e., they have been served). Background requests, on the other hand, are those that must be re-issued after they are executed (i.e., they loop forever executing only when the overload scheduler 124 decides so). The permanent loop is established as follows: whenever the rule-based decision maker 120 receives a background request, it proceeds to allocate resources by issuing an allocate notification 151 to the resource manager 126. The resource manager 126 then notifies the request handler 128 to execute (158) the request. Upon completion, the request handler 128 deallocates (159) the corresponding resources and issues a background_schedule 163 to the overload scheduler 124. The overload scheduler 124 then schedules the next background request and the loop is completed with the overload scheduler 124 issuing a background request 161 to the rule-based decision maker 120.

Figure 9:
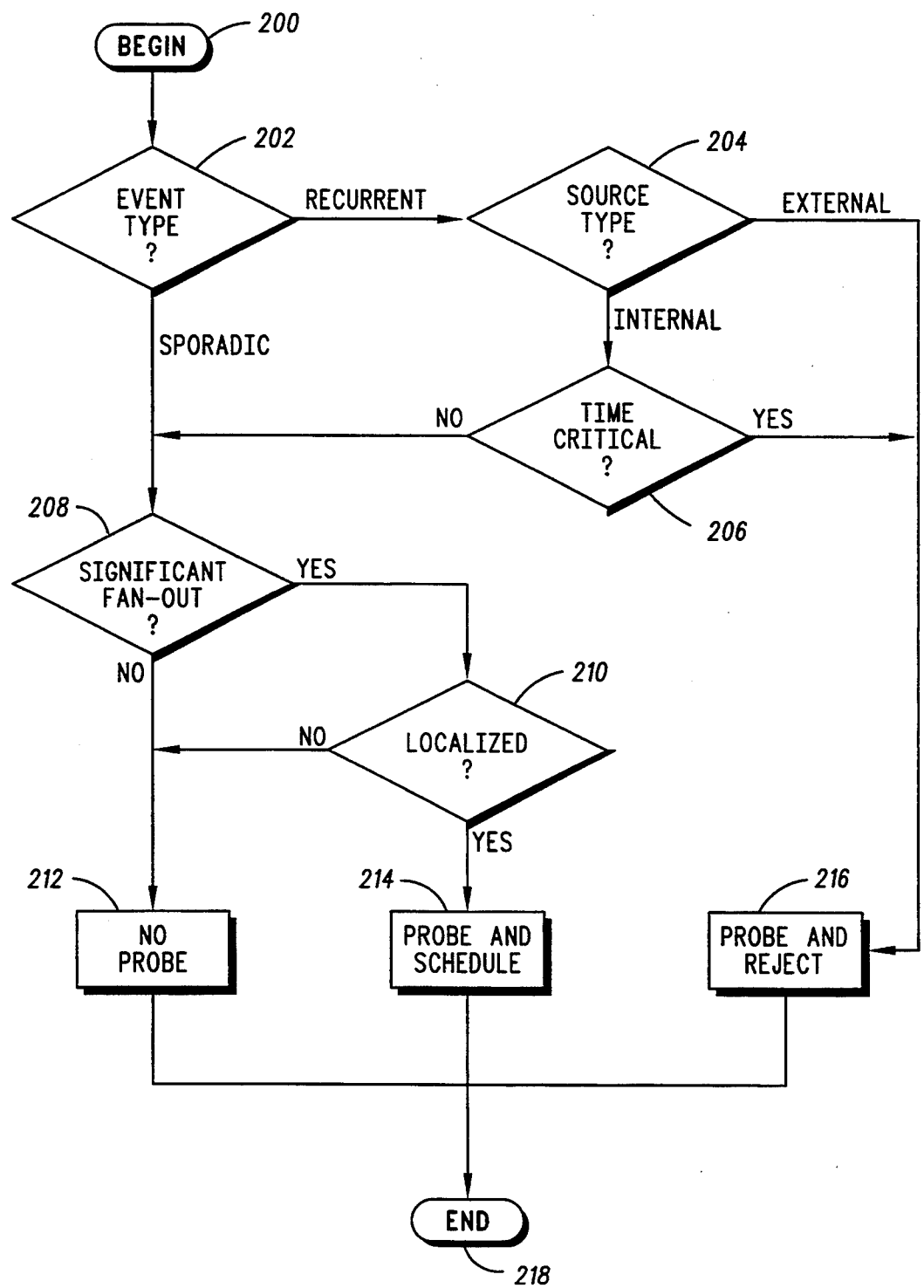
FIG. 9 is a flow chart showing the overload control rules and steps employed by the rule-based decision maker.

FIG. 9 is a flow chart showing the overload control rules employed by the rule-based decision maker 120 in accordance with the method of the present invention. When a request is made (200), the rule-based decision maker 120 determines from the request whether the event associated with the request is recurrent or sporadic (202). If recurrent, the rule-based decision maker 120 determines whether the request is internal or external (204). If external, the rule-based decision maker 120 probes, and then rejects as dictated by the outcome of the probe (216) before ending (218). If the source type is internal, the rule-based decision maker 120 determines if the request is time-critical (206). If the request is time-critical, then a probe-and-reject is performed (216) before ending (218). If the request is not time-critical in step 206, or if the request is sporadic in step 202, the rule-based decision maker 120 determines whether there will be significant fan-out (208). If there is no significant fan-out (208), no probe is issued (212), and the request is executed before ending (218). If decision 208 determines that a significant fan-out will occur, the rule-based decision maker 120 determines whether the fan-out will be localized (210). If the fan-out is determined in step 210 not to be localized, the request is executed without a probe (212) before ending (218). If the fan-out is determined in step 210 to be localized, then a probe-and-schedule is performed (214) before ending (218).

Figure 10:
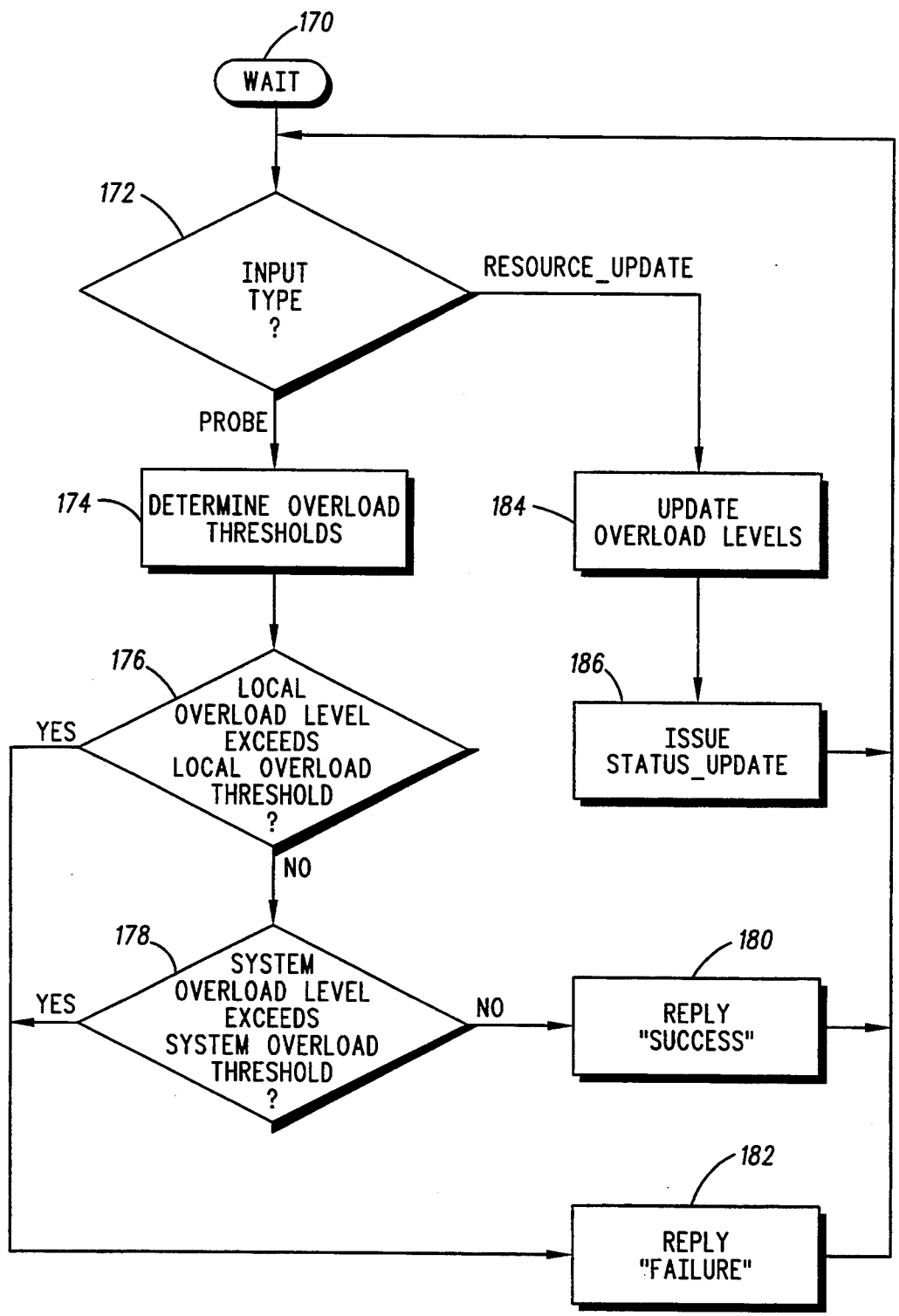
FIG. 10 is a flow chart showing the function of the inventory monitor.

FIG. 10 is a flow chart showing the function of the inventory monitor 122 in accordance with the method of the present invention. The inventory monitor 122 initially waits (170). When an input is received, the inventory monitor 122 determines the input type (172). If the input type is a resource_update, then the overload levels are updated (184), a status_update is issued (186), and the inventory monitor 122 returns to the waiting state 170. If the input type in step 172 is a probe, the overload thresholds are determined (174). If either the local overhead level exceeds the local overhead threshold (176) or if the system overload level exceeds the system overload threshold (178), a failure is replied (182) before the inventory monitor 122 returns to the waiting state 170. If the local overhead level does not exceed the local overhead threshold in step 176, and the system overload level does not exceed the system overload threshold in step 178, a success is replied (180) before the inventory monitor 122 returns to the waiting state 170.

Figure 11:
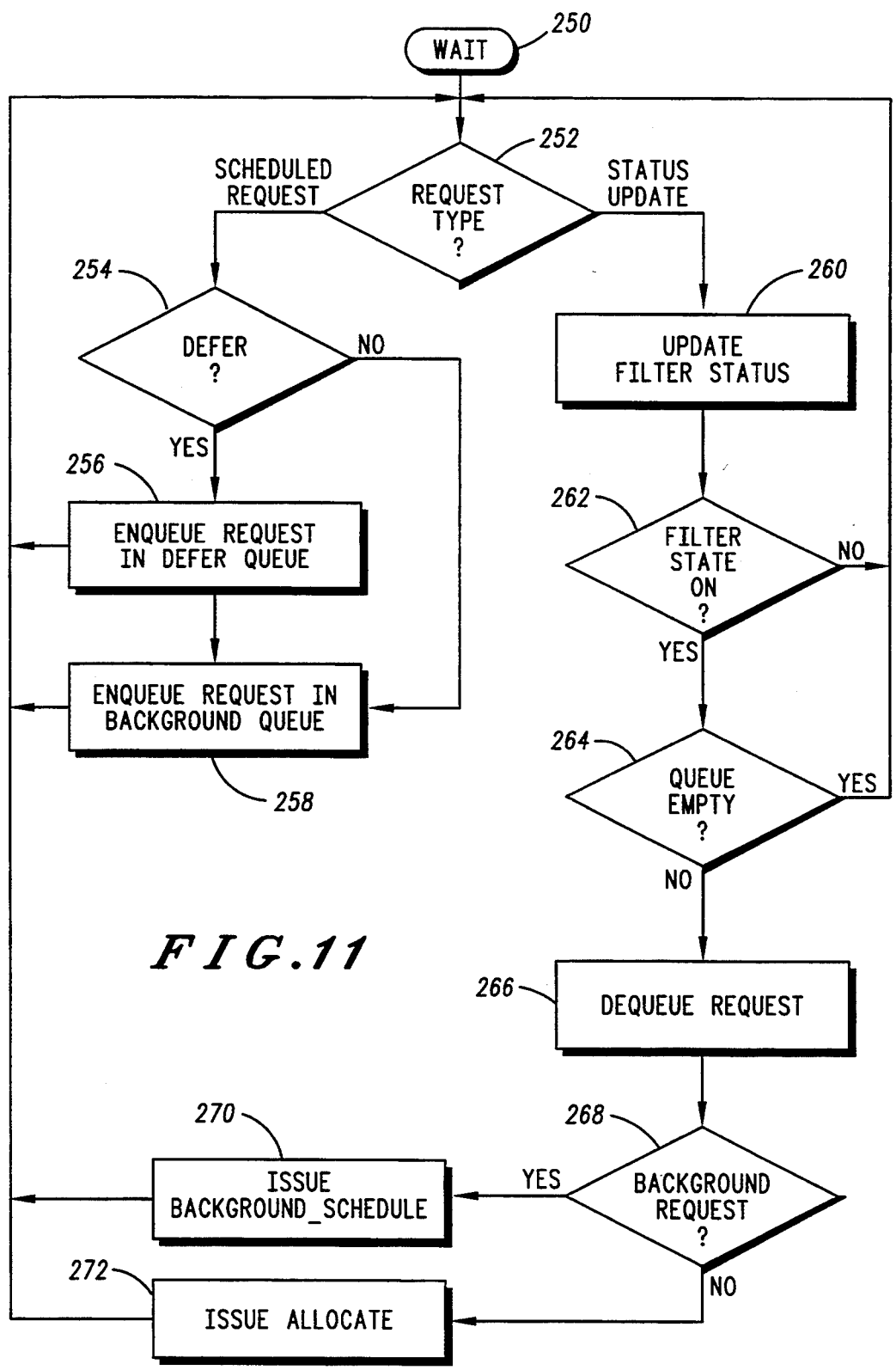
FIG. 11 is a flow chart showing the function of the overload scheduler.

FIG. 11 is a flow chart showing the function of the overload scheduler 124 in accordance with the method of the present invention. The overload scheduler 124 is initially in the wait state 250. When a request is made, the request type is determined (252). If the request is to schedule a request, then the overload scheduler 124 determines whether the request should be deferred (254). If the request is to be deferred, then the request is enqueued in the defer queue (256) before returning to the wait state 250. If the request is not to be deferred in step 254, then the request is enqueued in the background queue (258) and the inventory monitor 122 returns to the wait state 250. If the request is for a status_update in step 252, the appropriate resource usage filter state is updated (260) using the hysteresis loop of FIG. 12. The filter state is next checked (262). If the filter is in the OFF state, or if the filter is in the ON state but the queue is empty (264), the inventory monitor 122 returns to the wait state 250. If the filter is in the ON state in step 262 and the queue is not empty in step 264, a dequeue request is made (266). If a background request is made (268), then a background_schedule request is issued (270) and the inventory monitor 122 returns to the wait state 250. If a background request is not made in step 268, then an allocate command issues (272) and the inventory monitor 122 returns to the wait state 250.

Figure 12:
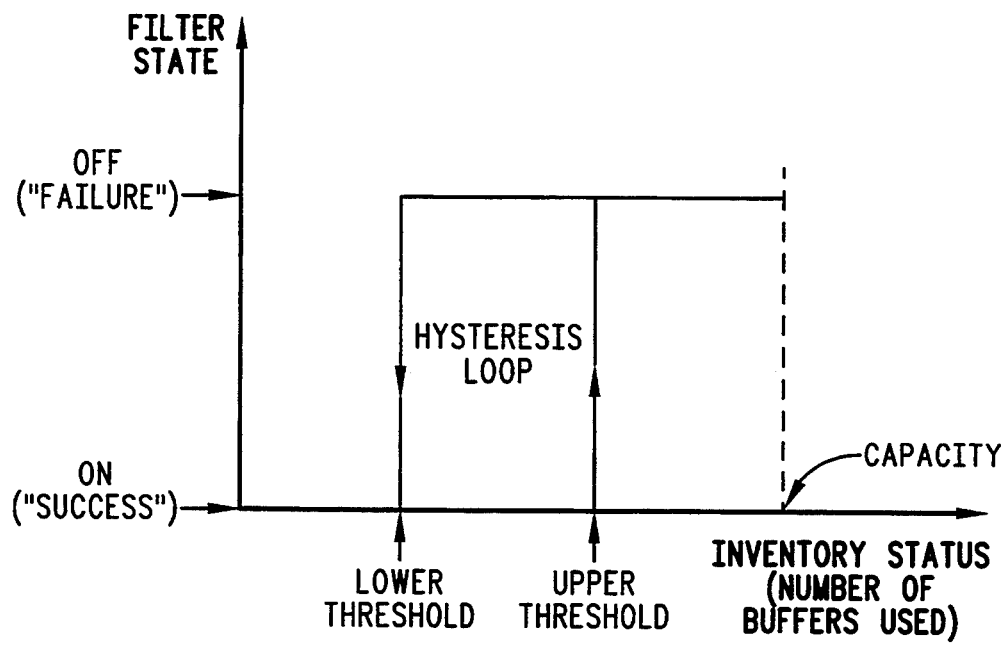
FIG. 12 shows the hysteresis effect associated with the filter used by the overload scheduler for scheduling defer and background requests.

FIG. 12 shows the hysteresis effect associated with the filter used by the overload scheduler for scheduling defer and background requests. The filter is initially in the ON state. When the inventory status first crosses the upper threshold, the filter changes to the OFF state and stays there until the inventory status next crosses the lower threshold. When the inventory status next crosses the lower threshold, the filter returns to the ON state.

Figure 13:
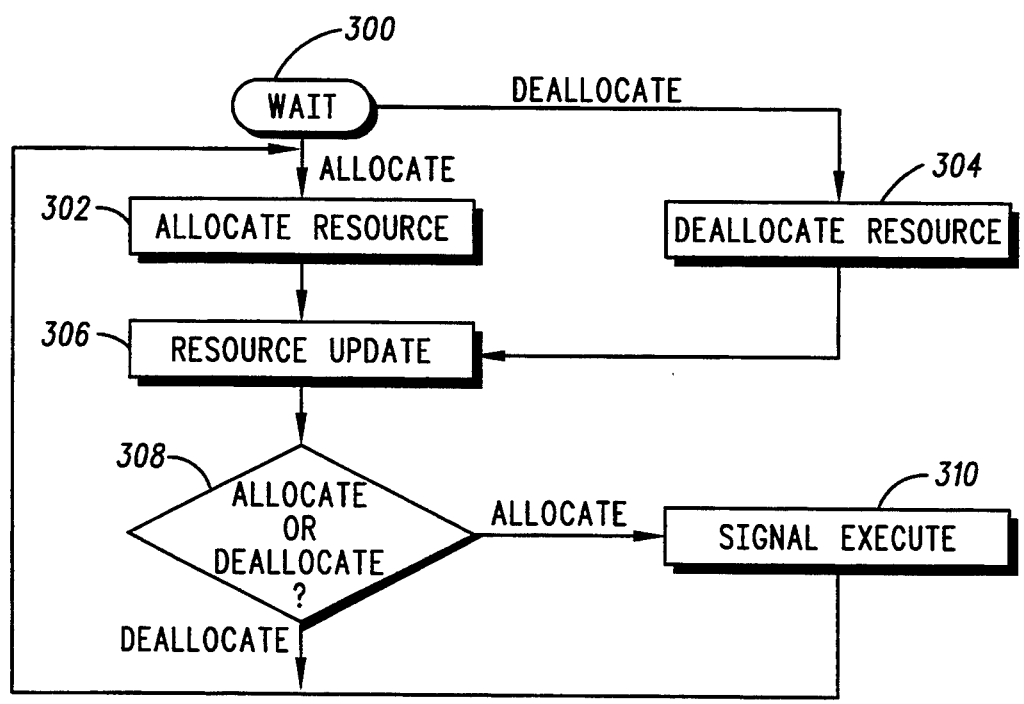
FIG. 13 is a flow chart showing the function of the resource manager.

FIG. 13 is a flow chart showing the function of the resource manager 126. The resource manager 126 is initially waiting (300). When told to allocate, it allocates resources (302) and updates the resource status (306). The resource manager then determines if an allocate command was received (308), and if an allocate command was received, signals execute (310) before returning to the wait state 300. For deallocation, the resource is deallocated (304) and the resource updated (306) before returning to the wait state 300.

Figure 14:
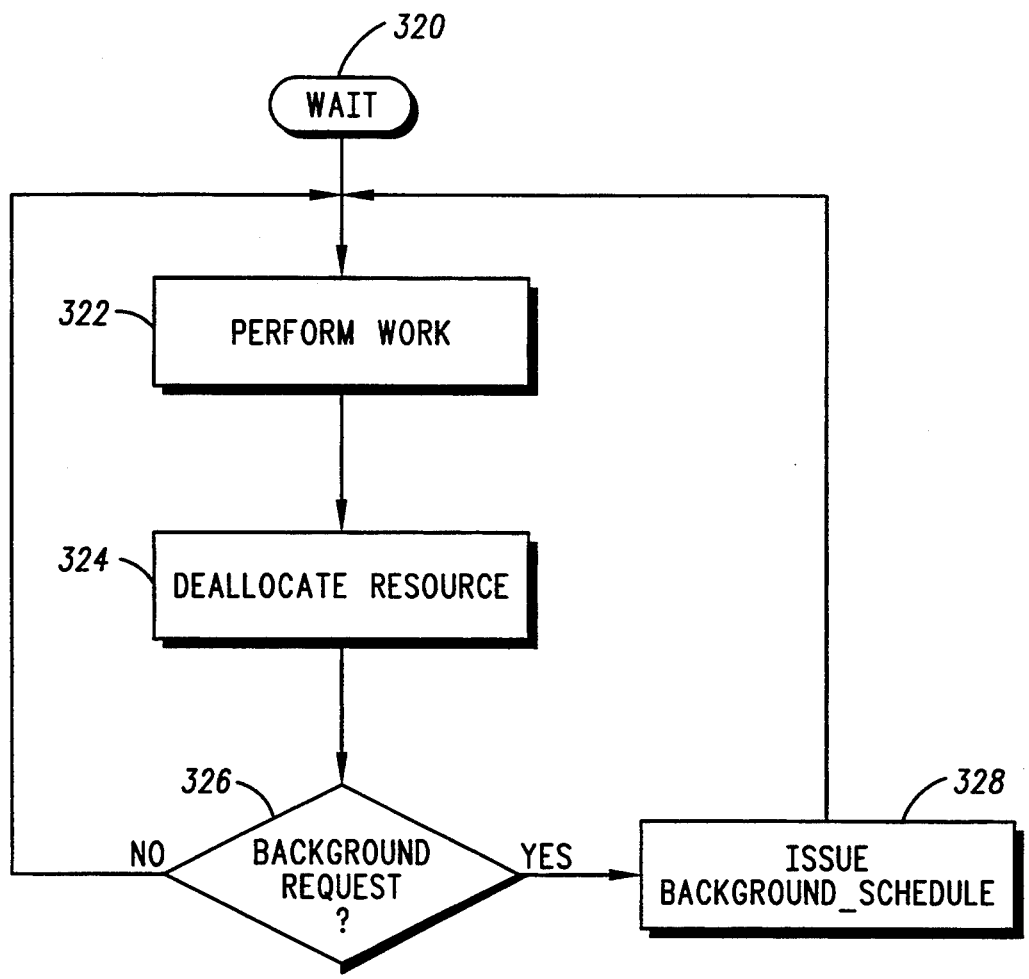
FIG. 14 is a flow chart showing the function of the request handler.

FIG. 14 is a flow chart showing the function of the request handler 128. The request hander 128 initially waits (320). When activated, it performs the requested work (322) and deallocates the resource (324). If the request was a background request (326), a background_schedule is issued (328), and the request handler 128 returns to the wait state 320. If no background request was made in step 326, the request handler 128 returns to the wait state 320.

While the present invention has been conceived in the context of a communication network, it can be applied to a general class of systems. Any real-time embedded system with soft deadlines can benefit from the invention. In particular, multiprocessor non-shared memory embedded systems can take advantage of the characteristic of the invention to regulate the work that must be performed by the system at all times.

Although an exemplary embodiment is described above, obviously, those skilled in the art may make many alterations and modifications without departing from the invention. Accordingly, all such alterations and modifications are included within the spirit and scope of the invention.

We claim:

1. A software overload control mechanism for maintaining the throughput of a communication system, the communication system composed of a plurality of inter-linked nodes, and each node having a plurality of inter-linked communication processors, the communication system having system resources, a load and a capacity, the communication system being susceptible to an overload condition where the load exceeds the capacity of the communication system, by regulating the amount of work accepted by the communication system, the mechanism comprised of:

a rule-based decision maker for receiving a request from the communication system for work to be performed and determining whether the request should be:
      rejected;
      deferred; or
      executed;
   an inventory monitor, for monitoring local and global system resource consumption coupled to the rule-based decision maker and
   an overload scheduler coupled to the decision maker, for prioritizing and scheduling any request that is deferred.

2. The mechanism of claim 1 further comprising a resource manager for allocating and deallocating system resources based upon the determinations by the rule-based decision maker of the work to be performed.

3. The mechanism of claim 2 where the rule-based decision maker includes means for distinguishing the type of work to be performed by the system.

4. The mechanism of claim 3 where the rule-based decision maker is coupled to the inventory monitor by way of a probe for determining the overload condition of the system.

5. The mechanism of claim 4 where the probe is a relevance based request issued by the rule-based decision maker.

6. A communication system comprised of:
   a plurality of inter-linked nodes, and each node having a plurality of inter-linked communication processors,
   a plurality of message buffers coupled to the communication processors;
   a rule-based decision maker for receiving a request from the communication system for the communication system to perform work and determining whether the request should be rejected, deferred; or executed;
   an inventory monitor, coupled to the rule-based decision maker, for monitoring local and global system utilization of message buffers; and
   an overload scheduler coupled to the decision maker, for prioritizing and scheduling any request that is deferred.

7. The communication system of claim 6 where the rule-based decision maker includes distinguishing means for distinguishing the type of work to be performed by the system.

8. The communication system of claim 7 where the rule-based decision maker is coupled to the inventory monitor by way of a probe for determining the overload condition of the system.

9. The communication system of claim 8 where the probe is a relevance based request issued by the rule-based decision maker.

10. A method for maintaining the throughput of a communication system, the communication system composed of a plurality of inter-linked nodes, and each node has a plurality of inter-linked communication processors, the communication system being subject to overload, by regulating the amount of work accepted by the communication system comprising the steps of:

determining whether a request for work to be done by the communication system was made;

assessing the overload level of the communication system;

rejecting the request if the overload level of the system is above a first pre-determined level; and accepting the request and executing the work if the overload level of the system is below a second pre-determined level.

11. The method of claim 10 where there are a plurality of different types of work, and where there are a plurality of different first and second pre-determined levels corresponding to each type of work.

12. The method of claim 11 where at least one type of work is to be performed regardless of overload level.

13. The method of claim 12 including the step of, if the work is not rejected, allocating system resources to perform the work immediately.

14. The method of claim 13 where the step of assessing the overload level of the system includes the step of assessing the overload level of at least one communication processor at the node.

15. The method of claim 13 including the step of assessing the overload level of all the communication processors at the node.

16. The method of claim 13 where the step of assessing the overload level of the system by assessing the overload level of all the communication processors at the node.

17. The method of claim 12 including the step of, if the work is not rejected, scheduling the work for execution by the system.

* * * * *